Figure 1:
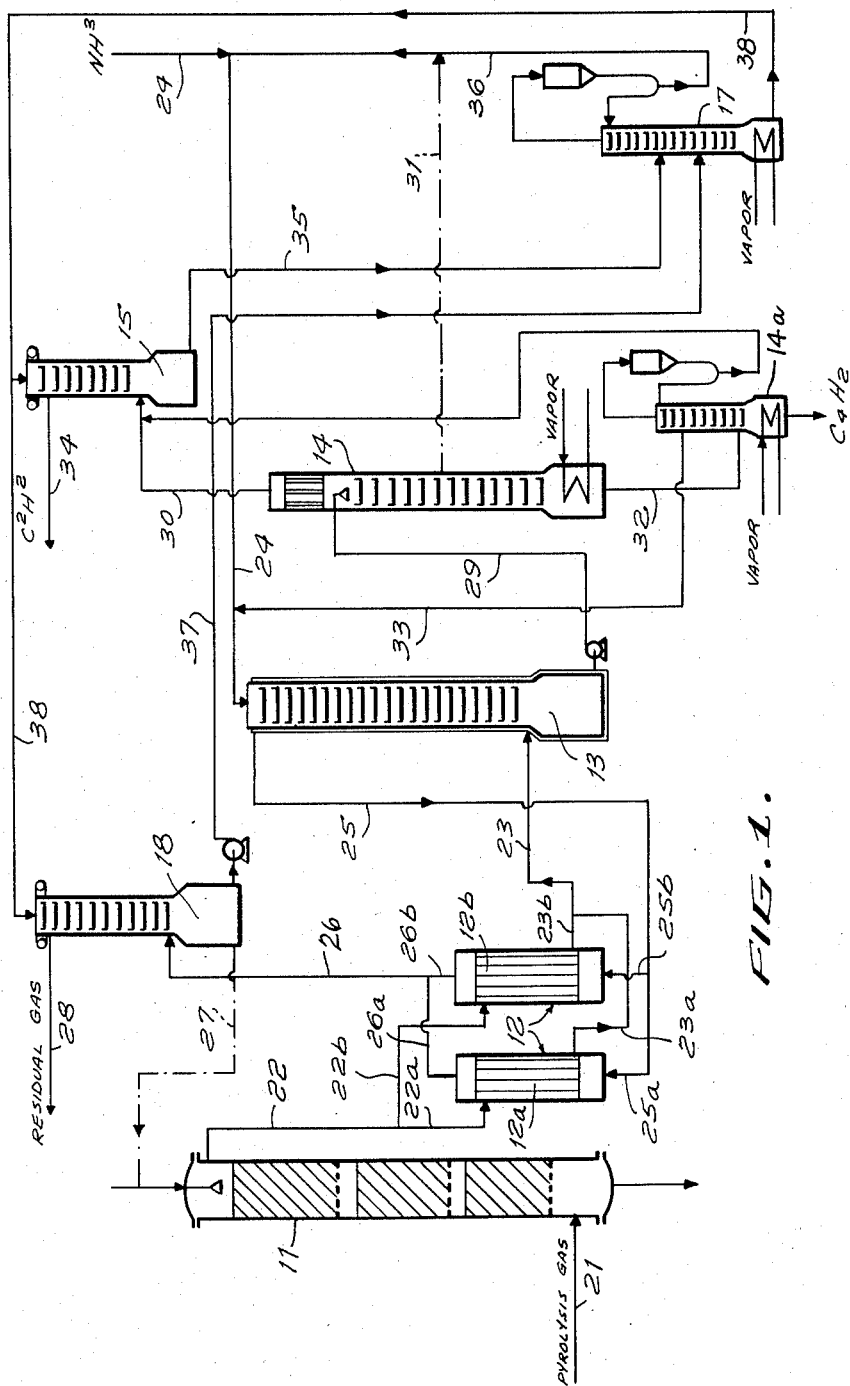

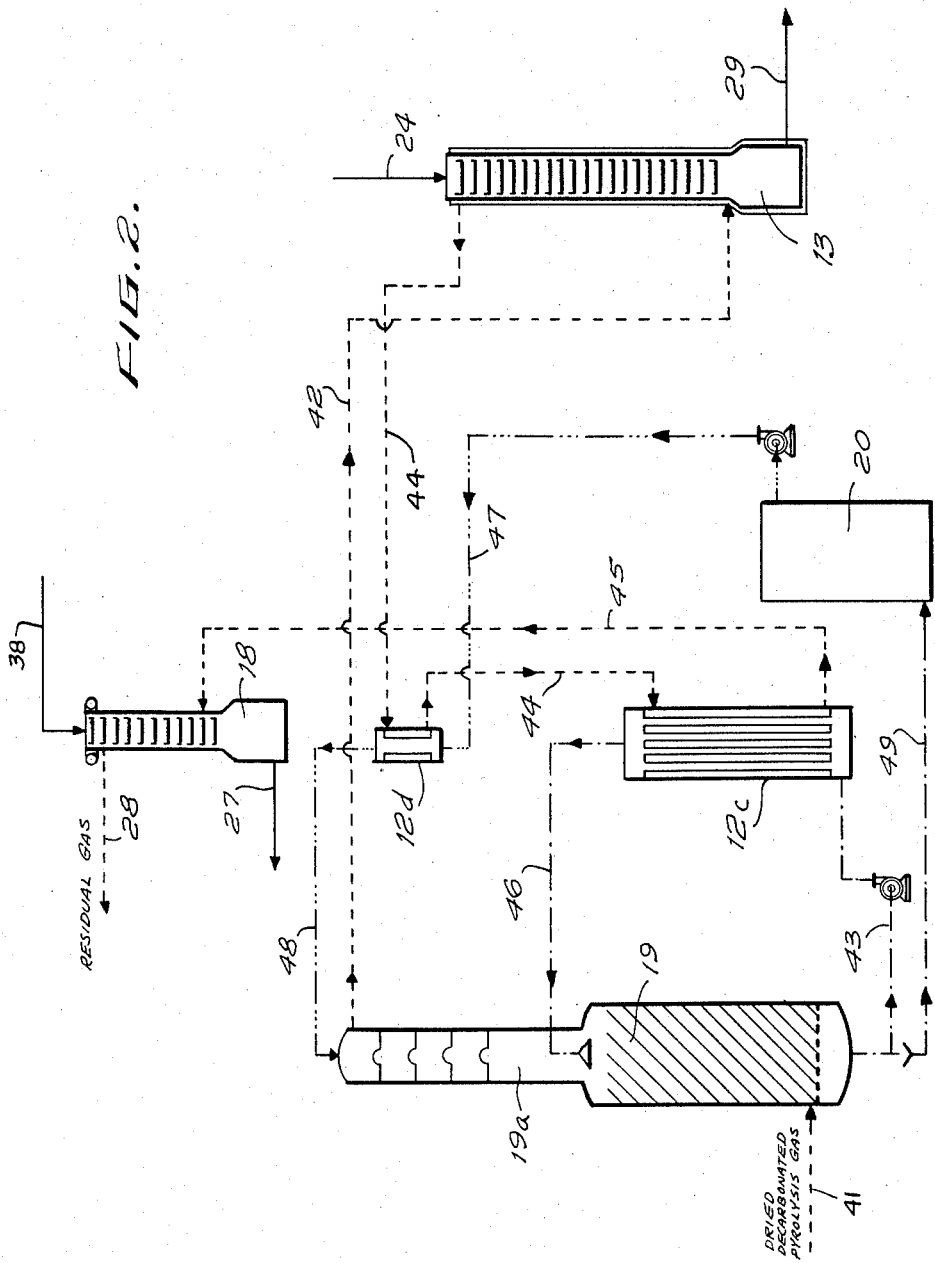

United States Patent Office 2,856,258
Patented Oct. 14, 1958

2,856,258

PROCESS FOR THE CONCENTRATION AND PURIFICATION OF ACETYLENE IN GASES FORMED IN THE PYROLYSIS OF HYDROCARBONS

Frederic Francois Albert Braconier, Plainevaux, and Jean Joseph Lambert Eugene Riga, Liege, Belgium, assignors to Societe Belge de l'Azote et des Produits Chimiques du Marly, Societe Anonyme, Liege, Belgium Application April 13, 1954, Serial No. 422,894

Claims priority, application Belgium April 13, 1953

6 Claims. (Cl. 23—3)

This invention relates to novel processes for the treatment of gases containing acetylene and homologues and polymers thereof to obtain acetylene in substantially pure form. More particularly, it relates to novel procedures whereby acetylene of sufficient purity for direct use in catalytic syntheses, and free of contaminating homologues and polymers thereof, may be separated from gases obtained by the pyrolysis of hydrocarbons.

Depending upon the hydrocarbons treated, viz., gaseous or liquid, saturated or unsaturated, and the nature of the pyrolytic treatment to which these hydrocarbons are subjected, e. g., by partial combustion, by means of recuperators or regenerators, by passage through an electric arc, by electric discharges, and the like, the quantitative and qualitative composition and the acetylene content of these pyrolysis gases will vary considerably.

In addition to the varying quantities of acetylene which they may contain, these pyrolysis gases generally contain hydrogen, carbon monoxide, carbon dioxide, aromatic hydrocarbons such as benzene, ethylene, light saturated hydrocarbons, and small quantities of polymers of acetylene, e. g., diacetylene, and of homologues of acetylene, hereinafter called "heavy acetylenes."

In order to separate acetylene from gas mixtures containing more or less considerable quantities thereof, it has already been proposed to treat these mixtures under pressure with liquefied anhydrous ammonia which, under predetermined conditions, selectively extracts the acetylene, but not the ethylene, for example, nor certain other light saturated or unsaturated hydrocarbons, nor again gases such as hydrogen or carbon monoxide.

Numerous solvents other than ammonia which have already been proposed and employed for the absorption by reason of their high, selective dissolving power for acetylene, or their low volatility, have inter alia the disadvantage of absorbing, together with the acetylene, the "heavy acetylenes" and of not permitting subsequent separation therebetween, so as to supply on de-gassing, sufficiently pure acetylene. Moreover, since they remain to a large extent in the solvent, in which they polymerize readily, these "heavy acetylenes" render the solvent impure and unsuitable for direct re-use without previous purification. By reason of the explosive nature of "heavy acetylenes," this purification by distillation, which is a troublesome operation entailing losses of solvent, is also attended by some danger.

As compared with these other solvents such as acetone, butyrolactone, dimethylformamide, etc., liquid ammonia also has the distinguishing feature that at —68° C. its dissolving power for acetylene is considerable (about 20 times as high, for example, as that of acetone at the ambient temperature) and that consequently it can be effectively used for the absorption even at atmospheric pressure, which would only be possible with other solvents if very considerable quantities of solvent were circulated.

To these advantages may be added the perfect selectivity of liquid ammonia for acetylene and homologues thereof, other constituents of gases of pyrolysis, viz., methane, carbon monoxide, nitrogen, hydrogen and ethylene, being but sparingly soluble in liquid ammonia.

Carbon dioxide, which with ammonia gives ammonium carbamate or, in the presence of water, ammonium carbonate, must obviously be eliminated. Due to the low temperatures at which the extraction of the acetylene is effected, the gas mixtures in question must also be freed from constituents such as cyclic hydrocarbons (benzene) which are capable of solidifying and consequently obstructing the apparatus in which the separation is carried out. This separation takes place in a pre-cooler preceding the absorption column, which pre-cooler moreover has the effect of retaining the water vapor contained in the gases. However, even when previously decarbonated, dried and freed from benzene, the gas generally still contains certain unsaturated hydrocarbons, including more particularly diacetylene, which the liquefied ammonia extracts therefrom together with the acetylene and which are troublesome and even dangerous impurities which must absolutely be eliminated.

Diacetylene and other higher hydrocarbons which are homologues of acetylene constitute, in fact, poisons for the catalysts employed in organic syntheses for which the acetylene recovered in concentrated form might subsequently be employed.

According to the present invention, the process for the extraction of acetylene from gas mixtures as hereinbefore specified by means of liquefied ammonia is carried out in such manner as to yield substantially pure acetylene which is free notably from diacetylene and "heavy acetylenes," with a minimum consumption of energy outside the system.

The technical means employed for this purpose in accordance with the invention consist principally in:

(1) Treating at atmospheric pressure or under pressure, by means of liquefied ammonia, the gases resulting from the pyrolysis of hydrocarbons, which have previously been partially decarbonated and dried and completely freed from benzene, in order to extract selectively therefrom the acetylene and the "heavy acetylenes," including more especially diacetylene;

(2) Separating from this ammoniacal extract, by distillation under pressure, the more volatile acetylene from the "heavy acetylenes" retained in the residue of the distillation, and from which the latter can, if necessary, be isolated;

(3) (a) Using the residual gases, freed from acetylene and "heavy acetylenes," but charged with ammonia vapors carried along and cooled by their contact with the liquefied ammonia in order, if necessary, to effect by heat exchange in the pre-cooler and substantially without external supply of refrigeration, the removal of the benzene from and drying of the crude gas and to maintain the system at the low temperature necessary for the extraction of the acetylene at normal pressure or elevated pressure and in order, if necessary, to decarbonate the crude gas by means of the ammonia carried along by the residual gases and recovered in the form of ammoniacal solution by absorption in water;

(b) Using if necessary, in the pre-cooler, for the removal of benzene from and the drying of the crude gas and for maintaining the system at the necessary low temperature, the cold solution of acetylene and "heavy acetylenes" in the liquid ammonia, before the solution is subjected to the distillation under pressure, in order to separate the acetylene;

(4) (a) Receiving the greater part of the ammonia in liquefied form, or (b) Using if necessary for the concomitant manufacture of an ammonium salt, either the whole of the ammonia employed for the extraction of acetylene, by neutralization, for example by means of an acid such as sulphuric acid, or only a part (or the whole) of the residual ammonia from the extraction, by absorption in an ammonium nitrate solution, followed by neutralization by nitric acid.

As compared with certain other solvents also already proposed for the extraction of acetylene, ammonia has the advantage of rendering the separation from the "heavy acetylenes" particularly easy by reason of the fact that the boiling point of the ammonia, viz., 33° C. at atmospheric pressure, lies between that of acetylene (—83.6° C. at atmospheric pressure) and those of the "heavy acetylenes."

The absorption of the acetylene and of the "heavy acetylenes" at atmospheric pressure or at neighboring pressures up to, for example, 5 kg./cm.$^2$, is notably advantageous because it permits the production of ammoniacal solutions having a concentration of acetylene and "heavy acetylenes" not higher than the critical concentration from the viewpoint of safety to be avoided, and because in addition it permits of effecting the absorption without an external supply of refrigeration.

In addition, by combining with one or more of the other aforesaid technical factors the extraction of acetylene by means of ammonia at normal pressure or at neighboring pressures and the separation, by fractionation under pressure, of the absorbed gases of the ammoniacal solution, it is possible to concentrate the acetylene in very pure state, free from "heavy acetylenes," substantially without any loss of solvent and with a minimum expenditure for driving power, fuels and energy.

The operational sequence according to the present invention is illustrated in the accompanying drawings, in which:

Fig. 1 is a flow sheet of the process showing the flow paths of the pyrolysis gas and the treating materials; and Fig. 2 is a partial flow sheet showing a modification in the procedure depicted in Fig. 1.

According to Fig. 1, after removal of dust, the pyrolysis gas which is to be treated for extraction of acetylene is introduced through duct 21 into scrubbing column 11 for removal of carbon dioxide contained therein.

In some modifications of the invention which are particularly advantageous from the viewpoint of the rational utilization of the solvent (ammonia) employed, or of the energy inherent in the system itself, the scrubbing for decarbonation is effected either by means of aqueous ammoniacal solutions obtained in the recovery of the ammonia vapors carried along with the residual gases in the subsequent stage of absorption by ammonia, or by means of aqueous ammoniacal solutions of ammonium salts, including for example ammonium nitrate.

The gas decarbonated by one of the aforesaid means is thereafter passed through the duct 22 into a pre-cooler or heat-exchanger 12 and freed from its condensable constituents (water vapor and heavy and cyclic hydrocarbon vapors) by intensive cooling, by means of the cold residual gas from the subsequent treatment with liquid ammonia or, in another embodiment, by means of the cold solution of acetylene and "heavy acetylenes" in the ammonia, which solution is obtained in the absorption column.

To this end, the exchanger comprises two compartments (12a and 12b) operating alternately, in order to permit the solidified constituents to be eliminated by thawing.

In order to prevent freezing of the temperature exchanger, and to avoid the use of a double apparatus, it is also possible to add to the gas to be treated a small proportion of a solvent such, for example, as methanol, acetone, dimethylformamide, or butyrolactone, etc., the condensable products being thus obtained in liquid form.

The gas, dried and freed from benzene, is then fed through the duct 23 into an absorption column 13, in which it is scrubbed by liquid anhydrous ammonia fed through the duct 24 at atmospheric pressure and at a temperature between —60° C. and —80° C. if the operation is carried out at atmospheric pressure or at a pressure in the neighborhood of atmospheric pressure. The acetylene is thus extracted in solution in the liquid ammonia together with the "heavy acetylenes," while the residual gas, cooled by its contact with the liquid ammonia and carrying ammonia vapors with it, is returned through the duct 25 to the exchanger 12 in order to serve therein as condensation agent by refrigeration and thereafter to be fed through the duct 26 to the column 18 for recovering the ammonia carried along, either by water or by aqueous salt solutions, or by acid juices.

The ammoniacal solutions obtained by absorption in water or in aqueous salt solutions and more particularly ammonium nitrate solution, may be passed through the duct 27 into the column 11 in order to decarbonate therein the crude pyrolysis gas before it is dried and freed from benzene by cooling in the exchanger 12.

The ammoniacal solutions thus carbonated may be regenerated, i. e., may be decarbonated, by heating, or in the case of ammonium nitrate solutions, they may be neutralized by nitric acid in order to be reused, partly for decarbonating the crude pyrolysis gas, and partly to serve for the manufacture of ammonium nitrate.

In the latter case, the decarbonation of the crude pyrolysis gas is thus effected at low cost for the regeneration of the recovered ammoniacal juices.

The residual gas from the absorption by liquid ammonia, which has been employed for pre-cooling and for recovery of ammonia carried along, is then discharged to its final destination through the duct 28.

The solution of acetylene and "heavy acetylenes" in the liquid ammonia, extracted from the absorption column 13, is sent to the distillation column 14 through the duct 29, in which it is fractionated under pressure into an ammoniacal evaporation residue retaining the water and the "heavy acetylenes," and first distillation fractions carrying exclusively acetylene with the greater part of the ammonia, passing out through duct 30.

According to another embodiment, it is possible by means of the distillation column alone, either by cooling the still head, or by working at higher pressure, to withdraw or tap off almost all the ammonia in the pure state at a given stage or level of the column, while collecting pure acetylene at the outlet of the condenser.

According to yet a further modification, it is also possible to distill in such manner as not to evaporate all the ammonia with the acetylene, but to recover at one of the plates some or even the greater part thereof in liquid form, which can be directly returned into the cycle through the duct 31 and used again for the extraction of the acetylene in the absorption column 13.

The ammoniacal distillation residue from the column 14 containing the "heavy acetylenes" is passed through the duct 32 into a small auxiliary column 14a, in which it is further fractionated in order to separate the "heavy fractions" from the greater part of the remaining ammonia, which is returned to the absorption column 13 through the duct 33.

By operating in this manner, that is to say, by constantly leaving the "heavy acetylenes" in solution in a certain quantity of liquid ammonia, all danger of explosion is eliminated.

The gaseous mixture of acetylene and ammonia escaping at the head of the distillation column 14 through the duct 30 passes into a scrubbing tower 15 in which the amomnia is absorbed by water at atmospheric pressure or under pressure, while the acetylene leaves the column through the duct 34 in practically pure form.

According to other modifications, the acetylene may also be isolated in the pure state by washing with aqueous solutions of ammonium salts, notably ammonium nitrate.

which dissolve the ammonia selectively, or by absorption in acid juices, for example sulphuric acid juices, which combine it chemically, by neutralization.

The ammoniacal saline solutions or liquors from the towers 15 and 18 are passed through the ducts 35 and 37 into the column 17 in which the ammonia is distilled under pressure and recycled in the liquid state in the direction of the absorption column 13 through the duct 36. The slightly ammoniacal water withdrawn at the bottom of the distillation column is recycled in the direction of the scrubbers 18 and 15 through the duct 38.

If the various technical factors hereinbefore described are combined in accordance with the invention, that part of the ammonia which is carried along either by the residual gases or by the acetylene recovered from its solution in the liquefied ammonia is recovered with a minimum expenditure of energy, as such, in the initial liquid form, or converted partially or entirely into a commercial ammonium salt, while the acetylene is obtained in a state of purity in which it is suitable for any uses and in particular for syntheses by catalysis.

In order to obtain this result, the following operations are combined:

The absorption of the acetylene by liquid ammonia, under atmospheric pressure or under a higher pressure;

The distillation, under pressure, of the acetylene solution in ammonia, the necessary pressure being obtained without the use of gas compression, the necessary compression energy being negligible since it is a question of the introduction of a liquid into the column under pressure;

The recovery of the volatilized ammonia by entrainment or distillation, by means of the absorption of the ammonia in water, the liberation of this ammonia from the aqueous solutions and the reliquefaction under pressure, by simple water cooling without external refrigeration, or by means of absorption in acid or saline juices, the later being thereafter neutralized by an acid;

The elimination of these constituents of the pyrolysis gas which are readily condensable to solids through pre-cooling by means of the residual gas from the absorption of the acetylene in the liquid ammonia.

The satisfactory performance of all these operations necessitates decarbonation of the initial gas, removal of benzene therefrom and drying thereof, in order to avoid obstruction of the apparatus by ammonium carbamate, by the solidified benzene or by the ice, in those parts of the circuit which are at low temperature.

Although in industrial practice the decarbonation by means of ammoniacal solutions at normal pressure or under higher pressure is never complete, it has been found that the residual $CO_2$ which escapes from the decarbonation under the conditions employed is converted into ammonium carbamate in the column for absorption by ammonia, but that the quantity of carbamate formed does not appreciably exceed that which is soluble in the ammonia at the temperature of the column. During the subsequent distillation of the ammonia containing acetylene, this small quantity of ammonium carbamate is dissociated into $CO_2$ and $NH_3$ owing to the higher temperature reached during this operation, and the carbon dioxide is thus gradually and quantitatively eliminated at the head of the first distillation column, jointly with the acetylene and the ammonia, from which it can readily be separated by known absorption means. Thus, for example, these small quantities of carbon dioxide distilling with the ammonia containing acetylene are absorbed by the scrubbing water in the column for the scrubbing of this gas mixture, and can be retained therein by the addition of a small quantity of caustic soda, or milk of lime, in order not to pass into the recovered ammonia which is recycled to the acetylene absorption column.

The removal of the benzene from and the drying of the pyrolysis gas through cooling by heat exchange with the residual gases from the absorption by the ammonia, necessitates either two exchangers operating alternately, or sprinkling of a single exchanger with a small quantity of a selective solvent which is capable of preventing freezing of the water and the benzenic hydrocarbons at the lower temperatures employed.

However, in industrial practice, the sprinkling of an exchanger with small quantities of liquid (methanol, acetone, etc.) affords serious technical difficulties.

In addition, in order to be effective, the heat exchange by indirect means between the gas to be cooled and the cold residual gases necessitates the use of very costly exchangers of large dimensions.

It is more advantageous, on the other hand, to effect the heat exchange of the cold residual gases, not by indirect contact with the pyrolysis gas, but by indirect contact with a solvent which does not freeze at the temperatures reached (for example methanol, acetone, butyrolactone or dimethylformamide) this solvent thus cooled being used in a much greater quantity in a scrubbing tower or column preceding the exchanger, in order to scrub and cool by direct contact with pyrolysis gas which has not been freed from benzene, but is already partially dried and decarbonated.

By operating in this manner, not only are the disadvantages due to freezing of the exchangers and the use of twin exchangers operating alternately avoided, but a much more effective temperature exchange is effected with an apparatus of smaller dimensions, and in addition further advantages and technical effects are obtained.

Thus, in this first stage of purification by the solvent, together with practically all the benzene and the water more than 90% of the diacetylene and the other homologues of acetylene are eliminated, the remainder, viz., 10%, being subsequently retained in the liquid ammonia. The diacetylene and other heavy acetylene compounds are thus obtained in one-tenth the quantity at the bottom of the column in which the acetylene-containing ammonia is distilled.

Depending upon the conditions appropriate in each case, this scrubbing with methanol may be effected at atmospheric pressure or under higher pressure.

In industrial practice, the following procedure will be adopted:

The crude pyrolysis gas, previously decarbonated and partially dried to the extent of about 90% by means of triethylene glycol, for example, is introduced at the bottom of the completely thermally insulated tower packed, for example, with Raschig rings sprinkled with methanol cooled by indirect contact in the heat exchanger with the residual gas from the absorption treatment of the acetylene by liquid ammonia. By its direct contact with the cooled methanol, the pyrolysis gas is cooled in turn, while yielding to the methanol, which thus becomes heated, the benzene and the other cyclic hydrocarbons, the remainder of the water and the greater part of the diacetylene, the vinyl acetylene, the methylacetylene and the other acetylene homologues, which it contains. Some of the methanol leaving the scrubbing column is directly returned to the exchanger in order to be re-cooled therein, while another part is continuously or periodically withdrawn in order to regenerate the methanol and recover the compounds extracted from the pyrolysis gas by the extraction solvent.

For a pyrolysis gas containing approximately 10% of acetylene, the quantity of methanol to be regenerated is between 100 and 400, and generally about 250 kg./ton of acetylene to be recovered.

In order to effect this regeneration, the methanol withdrawn is allowed to return to the ambient temperature in order to free it from the small quantity of dissolved acetylene, which may be returned into the cycle by introducing it either into the pyrolysis gas or into the gas with which the burners for the production of acetylene are fed, The liquid thus freed from dissolved acetylene may then be treated in various ways:

It may be mixed with water in a quantity sufficient to produce the formation of two layers, which are separated by decanting.

The upper layer contains a mixture of benzene and heavy hydrocarbons, leaving in the distillation column a non-volatile residue of tarry nature which is solid at the ambient temperature, while the lower aqueous layer, which has a high methanol content contains diacetylene and other heavy acetylenes in solution.

By distilling this aqueous layer under a current of nitrogen, carbon dioxide, or any other inert gas containing no oxygen, the diacetylene, the vinyl acetylene, the methyl acetylene, etc., in solution are first driven off, whereafter the methanol present in the aqueous mixture is recovered.

On the other hand, it is possible without employing water to fractionate directly the methanolic scrubbing liquid freed from acetylene, diacetylene and heavy acetylenes by heating in a current of nitrogen or other gas containing no oxygen, by distilling it in a heated column, at the head of which an azeotropic mixture of benzene and methanol is collected, while at the bottom pure methanol is obtained.

It is thus possible, after having eliminated the diacetylene by heating in a current of inert gas, to recover pure benzene and tars by means of a distillation column.

The following non-limitative examples illustrate various embodiments of the method of carrying out the process.

The first, which relates to the recovery of practically all the ammonia in the form of liquid, is conducted in accordance with the procedure illustrated schematically in Fig. 1. With regard to Examples II, III, and IV, which relate to the recovery of the ammonia partly in liquid form and partly in the form of sulphate (Examples II and IV) or of ammonium nitrate (Example III), they comprise certain modifications in the method of operation and in the apparatus, which depend upon the nature of the recovery agents employed, which modifications are not illustrated in the drawings since they are obvious to the person skilled in the art.

Examples V and VI, which are illustrated in Fig. 2, relate more particularly to modifications of the process in which the removal of benzene and the drying, prior to the ammonia treatment, are carried out by scrubbing the pyrolysis gas by means of cold methanol, with simultaneous absorption of the greater part of the heavy acetylenes.

EXAMPLE I

*Method of operation for recovering liquid ammonia*

450 m.³/h. of pyrolysis gas containing 8.6% of acetylene, 4% of carbon dioxide and 87.4% of various gases and vapors are decarbonated by any process, and freed in the exchanger 12, at atmospheric pressure, from the water vapor carried along and from the condensable hydrocarbons by cooling by means of the residual gases leaving the absorption column 13 at a temperature of —66° C. In this column, the acetylene and the "heavy acetylenes" are absorbed in counter-current manner at a temperature of —68° C. by 300 kg./h. of liquid ammonia circulating in a closed cycle, about one fifth of which is vaporized with the residual gases while the remainder dissolved 43 kg./h. of $C_2H_2$ and "heavy acetylenes."

This solution is pumped into the column 14 in order to be distilled therein, under a pressure of 15 atmospheres, by heating the bottom of the column to about 40° C. at which point about 2 kg./h. of acetylene and "heavy acetylenes" are withdrawn in solution in ammonia.

The latter solution is passed into a small column 14a, from the bottom of which the solution containing a high proportion of "heavy acetylenes," formed principally by ½ kg./h. of diacetylene in 5 kg./h. of ammonia is discharged.

At the head of the column 14, about 200 kg./h. of liquid ammonia containing very small quantities of acetylene (less than 0.5%), is withdrawn in "pasteurized" form and recycled to the top of the column 13.

The gas mixture consisting of 42 kg./h. of acetylene and 25 kg./h. of ammonia which escapes at the head of the column 14 is scrubbed under atmospheric pressure in the tower 15 sprinkled by 400 liters per hour of water, which absorbs the ammonia, in order to allow the substantially pure (99%) acetylene, notably free of "heavy acetylenes," to escape. 42 kg./h. of acetylene containing 0.4 kg./h. of ammonia is thus obtained, the ammonia being eliminated by passage through an acid juice.

In order to recover the ammonia, the scrubbing water from the tower 15 is introduced under a pressure of 15 atmospheres, at the same time as the juices coming from the column 18 into the distillation column 17. At the head of this column, gaseous ammonia is obtained, which when reliquefied by simple water cooling can be reused for the absorption of the acetylene in the tower 13.

The slightly ammoniacal water withdrawn from the base of the column 17 is recycled in the direction of the columns 15 and 18 intended for the recovery of the ammonia carried along by the residual gases.

The acetylene of the initial pyrolysis gas is thus recovered in a yield of about 99%, the loss of ammonia, for a quantity of 300 kg./h. in the cycle, comprising 3 kg./h. of ammonia. The energy consumption is 120 kw. hr. per ton of pure $C_2H_2$ and the consumption of high-pressure and low-pressure vapor is 9 and 3 tons, respectively, per ton of acetylene. The ammonia loss is compensated for by a corresponding supply of fresh liquid ammonia.

EXAMPLE II

*Method of operation for recovery of the ammonia carried along in the form of ammonium sulphate*

Into the absorption column sprinkled with 300 kg./h. of liquid ammonia there are introduced 430 m.³/h. of pyrolysis gas, previously freed from dust, decarbonated and dried (by cooling at —50° C.) and containing 9% of $C_2H_2$ (45 kg./h. in all) and 0.04% of heavy acetylenes (0.4 kg./h. in all).

The gases insoluble in ammonia, i. e., CO, $H_2$, $CH_4$, $N_2$, etc., carry along with them about 60 kg. of vaporized ammonia, the effect of which is to lower the temperature of the absorption column to —68° C.

From this column, ammonia containing 43 kg./h. of $C_2H_2$ (i. e., 95% of the initial $C_2H_2$) and 0.4 kg./h. of "heavy acetylenes" (i. e., 100%) is withdrawn at —68° C., the acetylene-containing ammonia having thus attained an acetylene content of from 10% to 20% by weight.

The ammoniacal acetylene solution is fed to a predetermined height in a first distillation column, maintained at 1.3 atmospheres absolute, the top of which is provided with a reflux condenser consisting of a tube cluster. The latter is maintained at a temperature of —78° C. by means of an external circulation of liquid ethylene at a temperature of from —90° C., to —100° C. under 1.5 to 2 atmospheres absolute.

By strictly regulating the pressure and the temperature at the reflux condenser, there is obtained at the top of the column, a liquid containing 96% of acetylene, free from heavy acetylenes and still containing 4% of ammonia, whereby obstruction of the condenser and of the reflux piping is avoided.

The greater part of the ammonia, containing the heavy acetylenes and less than 1% of acetylene is withdrawn at the base of this first distillation column in the liquid state.

The liquid mixture of 4% of ammonia and 96% of acetylene, freed from ammonia by passage through a scrubbing column fed with an ammonium bisulphate solution, directly supplies acetylene of 99.7% purity, which is free from heavy acetylenes and notably of diacetylene, and which may consequently be used for all types of catalytic syntheses, e. g., vinyl esters, butadiene, etc.

The liquid ammonia at —30° C. at the bottom of the first distillation column is delivered by a pump to a predetermined level in a second distillation column operating under 14 atmospheres absolute, on which is mounted a water-cooled reflux condenser. The temperature at the base of this column is about 50° C. and at the top about 30° C. Ammonia free from acetylene is thus recovered at the top of the column, and 10 kg./h. of ammonia containing all the heavy acetylenes and a little acetylene is obtained at the bottom of the column.

The latter mixture is introduced into an ammonium sulphate saturator in which, under the action of sulphuric acid and heat, the "heavy acetylenes" are destroyed or rendered harmless by polymerization and/or evaporation, while the ammonia is converted into ammonium sulphate. The juices resulting from the absorption, in the ammonium bisulphate solutions, of the mixtures containing 96% of liquid acetylene and 4% of ammonia are also introduced into this saturator.

EXAMPLE III

*Method of operation for recovery of the ammonia carried along in the form of ammonium nitrate*

Into a scrubbing column sprinkled with 2500 kg./h. of 60% aqueous ammonium nitrate solution and containing 61 kg./h. of ammonia incorporated therein in the ammonia recovery column, there are introduced 457 m.³/h. pyrolysis gas freed from dust, which contain 39 m.³/h. of acetylene and 18 m.³/h. of carbon dioxide.

The gas thus decarbonated, but which, charged in the scrubbing column with 14 kg./h. of ammonia under the action of the vapor pressure of the ammoniacal ammonium nitrate solution, is scrubbed in a second scrubbing column by 2500 kg./h. of aqueous 60% ammonium nitrate solution in order to absorb the ammonia carried along, and is thereafter passed successively into the alternately operating heat exchangers, the column for absorption by ammonia liquid and the installation for separation by distillation as in Example I. 400 m.³/h. of residual gas, coming from the absorption column carrying 63 kg./h. of ammonia, are scrubbed in the recovery column by 2500 kg./h. of ammoniacal 60% ammonium nitrate solution, which recovers 61 kg./h. of the ammonia carried along, the resultant ammoniacal ammonium nitrate solution then being employed to sprinkle the column for the decarbonation of the initial gas.

The juices collected from the two scrubbing columns, when passed into a saturator fed with 420 kg./h. of 54% nitric acid, liberate 18 m.³ of carbon dioxide and supply 480 kg./h. of 60% ammonium nitrate juice employed in the manufacture of ammonium nitrate by concentration and 5000 kg./h. of ammonium nitrate juice, which are recycled to the heads of the column for the recovery of the ammonia carried along and of the second scrubbing column, respectively.

EXAMPLE IV

*Method of operation for recovery of the ammonia carried along in the form of ammonium sulphate*

1500 to 1600 m.³/h. of gas of pyrolysis freed from dust and containing from 9% to 10% of acetylene, carbon dioxide, carbon monoxide, hydrogen, 0% to 6% of methane, nitrogen, cyclic hydrocarbons (benzene), and "heavy acetylenes" (diacetylene), etc. are decarbonated in the scrubbing column by means of ammoniacal juices, whereafter these juices are regenerated by heating in order to be returned into circulation.

As in the preceding examples, the decarbonated pyrolysis gas is then dried and freed from benzene in the exchanger by cooling, by means of the residual gas returning from the extraction of acetylene by liquid ammonia in this column for absorption of the acetylene.

The residual gas from this absorption, after having been returned to the exchanger, passes into the recovery tower for absorption of the ammonia carried along, by means of sulphuric acid, which combines the ammonia in the form of ammonium bisulphate or ammonium sulphate, and is thereafter fed to a sulphater (hereinafter to be referred to).

The solution of acetylene and "heavy acetylenes" in the ammonia is pumped from the absorption column into the distillation column, operating under a pressure of 15 atm. at the ambient temperature. There are withdrawn:

At the top: a gas mixture of acetylene and entrained ammonia, which is fed to the sulphater, for absorption of the ammonia in sulphuric acid with the formation of ammonium sulphate.

At an intermediate plate: liquid ammonia which is recycled.

At the base: an aqueous ammoniacal solution of heavy acetylenes and diacetylene, which is fed to a small auxiliary column for polymerization and partial distillation of the "heavy acetylenes" by a current of live steam of sulphuric acid, while the liquid residue of this distillation is sent to the sulphater.

In the sulphater, to which are fed the fresh sulphuric acid employed, the sulphuric ammonium sulphate solution from the recovery tower, the gaseous acetylene mixture and the ammonia liberated at the top of the distillation column, as well as the acid distillation residue of the auxiliary column, the water is evaporated off from these solutions by the heat of neutralization of the sulphuric acid by the ammonia and without any external supply of heat.

Crystallized ammonium sulphate is thus obtained therein, while the acetylene is separated in pure form by condensing the steam from the gaseous mixture of acetylene and steam which is liberated from the saturator.

The liquid ammonia expended in the formation of ammonium sulphate is replaced by fresh liquid ammonia gradually as eliminated.

It must be understood that in the case of manufacture of ammonium nitrate, ammonium sulphate or other ammonium salts, taking place concomitantly with the separation of the acetylene, the ratio between the ammonia recovered in liquid form and the ammonia discharged from the cycle by neutralization may vary as desired, in accordance with the technical conditions of the installation or with the economic factors to be considered, and that if necessary the whole of the ammonia employed for the separation of the acetylene may be combined in the form of salts.

EXAMPLE V

*Scrubbing with methanol prior to the absorption by ammonia under atmospheric pressure*

450 m.³/h. pyrolysis gas containing 9% of acetylene 4% of carbon dioxide and 87% of various gases and vapors are decarbonated by any known process and are thereafter dried to the extent of about 90%, by passing them from the bottom upwards through a column packed with Raschig rings (not shown in the diagram) and sprinkled with triethylene glycol under the conditions normally adopted in practice.

As shown in Fig. 2, the partially decarbonated and dried gas is thereafter introduced through the duct 41 at ambient temperature, i. e., at a temperature between 0° and 25° C., into the lower part of a completely thermally insulated scrubber 19 packed with Raschig rings and sprinkled with 250 l./h. of methanol recovered in the pure state and leaving the exchanger 12c, in which it is cooled to —58° C.

The pyrolysis gas, already partially purified in the scrubber 19, is then passed through a column 19a containing dished plates, which is directly connected to the scrubber 19 and sprinkled in counter-current manner with 10 to 15 l./h. of regenerated or fresh methanol.

Thus cooled and freed from benzene and other heavy hydrocarbons, the water still present after the drying with triethylene glycol, as also about 90% of the diacetylene and of the other heavy acetylenes, by successive direct contact with recovered and regenerated (or fresh) methanol, the gas may be sent directly through the duct 42 to the column 13 for the absorption of the acetylene by liquid ammonia. Owing to the purification which it has undergone, the gas does not deposit any solid materials likely to obstruct the equipment.

A part of the methanol collected at the base of the scrubber at a temperature of about 0° C. and charged with the impurities extracted from the pyrolysis gas is sent through the duct 43 into the tube cluster of the exchanger 12c in order to be re-cooled therein to −58° C. by means of the residual gases escaping through duct 44 at −68° C. from the column 13 (for the absorption of the acetylene by anhydrous ammonia), but first passing through a small auxiliary exchanger 12d. These residual gases, which are thus heated to −10° C., are then fed to the column 18 through duct 45 for the recovery of the entrained ammonia, while the impure methanol, re-cooled to −58° C., is delivered to the top of the scrubber 19 through the duct 46.

A fraction of from 10 to 15 l./h. of the methanol collected at the base of the scrubber 19 at a temperature of about 0° C. is extracted from the main circuit through the duct 49 in order to be regenerated in an attached installation 20, by separation of the impurities extracted from the pyrolysis gas. For this purpose, it is mixed with an equal volume of water and the benzenic layer comprising from 7% to 10% of the mixture and consisting of from 60% to 70% of benzene, 10% of diacetylene and heavy acetylenes and from 20% to 30% of tars is separated from the aqueous layer of methanol.

From the aqueous layer, freed from the diacetylene and the heavy acetylenes by degassing with a current of the gas feeding the pyrolysis furnace, the methanol is regenerated by rectification in a distillation column (not shown) and is thereafter fed through the duct 47 into the small auxiliary exchanger 12d, connected in series with the exchanger 12c in order to be cooled therein to −58° C. by the residual gas flowing through duct 44 from the column 13, as described. The methanol thus regenerated and cooled to −58° C., in introduced through the duct 48 at the top of the column 19a comprising dished plates, which is mounted on the scrubber 19. Due to the fact that the regenerated methanol is purer than the methanol employed to sprinkle the scrubber 19, in descending it completes the purification of the gas already partially purified by the unregenerated methanol directly returned into the cycle through duct 46. The completely purified gas cooled to −58° C., is then passed directly through the duct 42 to the column 13 for absorption of the acetylene by the liquid ammonia.

EXAMPLE VI

*Scrubbing with methanol prior to the absorption by ammonia under 12 atm.*

8600 m.³/h. of decarbonated pyrolysis gas containing 10% of acetylene are introduced into the lower part of the scrubber 19 (Fig. 2) sprinkled with 5 m.³/h. of recovered impure methanol leaving the exchanger 12c, in which it has been re-cooled to −5° C., then pass into the column 19a sprinkled with a counter-current stream of 0.25 m.³/h. of regenerated or fresh methanol, in order to be fed directly to the column 13 for the absorption of the acetylene by anhydrous ammonia under a pressure of 12 atm.

A fraction of the methanol, collected at the base of the scrubber 19 at a temperature of about +15° C. and passed into the tube cluster of the exchanger 12c, is re-cooled to −5° C. by means of the residual gases leaving the column 13 at −25° C. for the absorption of the acetylene by anhydrous ammonia under pressure and first passing through the small exchanger 12d. The gases thus heated to +5° C. are then passed to the column 18 for the recovery of the entrained ammonia, while the methanol, although being impure, but cooled again to −23° C., is delivered to the top of the scrubber 19. A fraction of 0.25 m.³/h. of the methanol extracted from the base of the scrubber 19 at a temperature of +15° C. is regenerated in the attached installation 20 by mixing it with an equal volume of water, separating the aqueous methanol layer from the benzenic layer and treating the two layers as in Example V, the methanol, regenerated and cooled to −10° C., being introduced at the top of the column 19a in order to complete therein the purification of the pyrolysis gas before it is sent to the column 13 for the absorption of the acetylene by liquid ammonia.

By proceeding in accordance with the modified forms of the process described in Examples V and VI, a number of further appreciable advantages of industrial interest are obtained:

The decarbonation of the crude gas is rendered easier.

Since the freezing of the exchangers is avoided owing to the scrubbing of the gas by a solvent, the use of multiple exchangers alternately operating and thawing is not necessary.

The indirect heat exchange between the residual gas and the liquid solvent in the exchangers on the one hand, and the direct heat exchange between the pyrolysis gas and the solvent in the scrubbing column on the other hand, in accordance with these modifications is much more effective than the indirect heat exchange between gases in accordance with the process described in Examples I to IV. Consequently, the overall dimensions of the installation for the preliminary purification and cooling may be considerably smaller for the same output.

Owing to the elimination, by the solvent, of the greater part of the diacetylene and the homologues thereof before the treatment of the gas by the liquid ammonia, the distillation residues of the acetylene-containing ammonia contain far less of these impurities, which are troublesome by reason of their tendency to polymerize into solid components capable of obstructing the equipment.

While, as is well known, the prior processes for the purification and concentration of acetylene necessitate the handling of substances rendered explosive by the presence of solid polymers, produced from heavy acetylenes, it has surprisingly been observed that the solid compounds which, in the process according to the invention, are collected at the foot of the ammonia distillation column do not explode under impact or heat.

By the combination of the various technical means according to the invention, there are obtained inter alia the effects and advantages which consist in obtaining from gases of pyrolysis, even of low acetylene content and very complex composition, acetylene of a purity of 99.7%, which is notably free from higher homologues. This is achieved by means of a simple apparatus which, with a reduced consumption of energy, refrigeration and solvent and without danger of explosion, permits the acetylene to be recovered from the accompanying gases and which further permits the decarbonation of the pyrolysis gas to be effected without steam consumption, the elimination of benzene without additional cost, and the complete separation of the acetylene, notably from the catalytically troublesome impurities, without contamination of the extraction solvent by these impurities.

Various changes and modifications may be effected without departing from the spirit and scope of the present invention and it is intended that such obvious changes and modifications be embraced by the annexed claims.

What is claimed is:

1. The process for the separation and purification of acetylene from a mixture of gases containing acetylene, homologues and polymers thereof, and condensable gases and non-condensable gases containing carbon dioxide, and obtained by pyrolysis of hydrocarbons, which comprises the first step of contacting said pyrolysis gas mixture with an aqueous ammonia solution, obtained during the fourth step, whereby said pyrolysis gas mixture is decarbonated by removal of $CO_2$ taken up by said aqueous ammonia solution; the second step of subjecting said decarbonated gas mixture to indirect heat exchange with residual gases from the third step to remove condensable gases by condensation; the third step of scrubbing the remaining gas mixture of acetylene gases and non-condensable gases with liquid ammonia to dissolve the acetylenic gases and to leave a residue of cooled undissolved non-condensable gases, and effecting said indirect heat exchange cooling of the said decarbonated gas mixture in the second step with said residue; the fourth step of contacting said residue of cooled non-condensable gases with water for recovery of ammonia entrained in said scrubbing step to form an aqueous ammonia solution, and recycling said aqueous ammonia solution for said initial decarbonation in the first step; and the fifth step of distilling under pressure said liquid ammonia containing said dissolved acetylenic gases from said scrubbing step into a stable bottom distillation residue of homologues and polymers of acetylene in ammonia and an overhead fraction of acetylene free from said homologues and polymers thereof.

2. The process according to claim 1, wherein said fifth step comprises withdrawing substantially pure liquid ammonia at an intermediate point on said distillation vessel, scrubbing said overhead fraction of acetylene with water to remove ammonia contained therein, said aqueous ammoniacal solution being distilled to produce substantially pure ammonia, liquefying said ammonia, combining said liquefied ammonia with the liquid ammonia withdrawn from said distillation vessel, and recycling said combined ammonia liquids for dissolution of further quantities of acetylenic gases.

3. The process for the separation and purification of acetylene from a mixture of gases obtained by pyrolysis of hydrocarbons and containing acetylene, homologues and polymers thereof, and condensable gases and non-condensable gases containing carbon dioxide, by selective low temperature extraction of the acetylenic gases with liquid ammonia and fractional distillation of the ammoniacal extract into its constituents, which comprises the combination of said extraction and distillation with the further steps of purifying the raw pyrolysis gas prior to treatment with liquid ammonia to eliminate carbon dioxide therefrom, by absorption thereof in ammoniacal solutions obtained from absorption of ammonia contained both in the residual gases of said extraction of the acetylenic gases with liquid ammonia and in the acetylene resulting from said fractional distillation; eliminating by condensation the condensable gases and vapors from the so decarbonated pyrolysis gas by indirect heat exchange with the residual gases of said extraction of the acetylenic gases with liquid ammonia; distilling under pressure the said ammoniacal extract of acetylene compounds by fractional distilling of said extract into a distillation residue containing the homologues and polymers of acetylene in ammoniacal solution, an intermediate fraction containing a major portion of the ammonia used, and an overhead fraction of acetylene gas having therein a portion of the used ammonia in gas phase; distilling under pressure the said distillation residue and recovering the liquid ammonia which is recycled to absorb the acetylenic gases from the purified pyrolysis gas; recovering the ammonia from the said intermediate fraction of the said distillation of the ammoniacal extract of acetylene compounds and recycling said ammonia to absorb again the acetylenic gases from the purified pyrolysis gas; and treating the overhead fraction to rid acetylene gas therein of the entrained ammonia by scrubbing with water to dissolve the said entrained ammonia and yield ammoniacal solution recycled to said absorption step of carbon dioxide from the raw pyrolysis gas.

4. Process as claimed in claim 3, wherein the condensable gases are eliminated by direct contact with methanol, previously cooled by heat exchange with the residual gases of the extraction of the acetylenic gases with liquid ammonia.

5. Process as claimed in claim 4, wherein the condensable gases are elominated in two stages comprising a first stage wherein a portion of the used and cooled methanol is reused, and a second stage wherein fresh methanol and a different portion of the used solvent, having been regenerated by purification and cooled, are admixed and passed together to the first stage and joined with the directly reused solvent.

6. The process as claimed in claim 3, wherein the said ammoniacal extract of acetylene compounds is subjected to fractional distillation at a pressure of 10 to 25 atmospheres.

References Cited in the file of this patent

UNITED STATES PATENTS

| | | |
|---|---|---|
| 1,684,448 | Kinkel | Sept. 18, 1928 |
| 2,183,148 | Murphree | Dec. 12, 1933 |
| 2,236,964 | Babcock | Apr. 1, 1941 |
| 2,640,757 | Robinson | June 2, 1953 |
| 2,741,332 | Finneran et al. | Apr. 10, 1956 |

FOREIGN PATENTS

| | | |
|---|---|---|
| 692,169 | Germany | June 14, 1940 |

OTHER REFERENCES

Hasche: Abstract of application Serial No. 633,843, published Feb. 7, 1950, 631 O. G. 283.

Seidell: Solubilities of Inorganic and Organic Compounds, volume I, D. Van Nostrand Co. Inc., 1919, page 17.

UNITED STATES PATENT OFFICE

CERTIFICATE OF CORRECTION

Patent No. 2,856,258                                                   October 14, 1958

Frederic Francois Albert Braconier et al.

It is hereby certified that error appears in the printed specification of the above numbered patent requiring correction and that the said Letters Patent should read as corrected below.

Column 2, line 68, for "Receiving" read -- Recovering --; column 3, line , for "33° C." read -- -33° C. --; column 11, line 47, for "in" read -- is --; column 14, line 29, for "elominated" read -- eliminated --.

Signed and sealed this 13th day of January 1959.

(SEAL)

Attest:
KARL H. AXLINE

Attesting Officer

ROBERT C. WATSON
Commissioner of Patents